(12) United States Patent
Bockenstette et al.

(10) Patent No.: US 8,968,143 B2
(45) Date of Patent: Mar. 3, 2015

(54) MULTI-SPEED TRANSMISSION WITH AN ENGINE START/STOP ENABLER

(71) Applicant: GM Global Technology Operations LLC, Detroit, MI (US)

(72) Inventors: Casie M. Bockenstette, Clarkston, MI (US); Robert L. Moses, Ann Arbor, MI (US); Carlos E. Marin, Oxford, MI (US); Zhen J. Zhang, Canton, MI (US)

(73) Assignee: GM Global Technology Operations, LLC, Detroit, MI (US)

( * ) Notice: Subject to any disclaimer, the term of this patent is extended or adjusted under 35 U.S.C. 154(b) by 11 days.

(21) Appl. No.: 14/022,924

(22) Filed: Sep. 10, 2013

(65) Prior Publication Data

US 2014/0011626 A1    Jan. 9, 2014

Related U.S. Application Data

(63) Continuation of application No. 13/216,991, filed on Aug. 24, 2011, now Pat. No. 8,556,765.

(51) Int. Cl.
| | |
|---|---|
| F16H 3/62 | (2006.01) |
| F16H 3/44 | (2006.01) |
| F16H 3/66 | (2006.01) |
| F16H 61/06 | (2006.01) |

(52) U.S. Cl.
CPC .. *F16H 3/62* (2013.01); *F16H 3/66* (2013.01); *F16H 61/06* (2013.01); *F16H 2200/006* (2013.01); *F16H 2200/2012* (2013.01); *F16H 2200/2043* (2013.01)
USPC ........................... 475/275; 475/293; 475/303

(58) Field of Classification Search
CPC .................. F16H 2200/006; F16H 2200/2012; F16H 2200/2043; F16H 2200/2064; F16H 2200/2094
USPC ................... 475/275, 293, 303; 477/174–181
See application file for complete search history.

(56) References Cited

U.S. PATENT DOCUMENTS

| | | | |
|---|---|---|---|
| 4,729,462 A | 3/1988 | Braun | |
| 6,771,031 B1 | 8/2004 | Bai | |
| 7,699,741 B2 | 4/2010 | Hart et al. | |
| 8,556,765 B2 * | 10/2013 | Bockenstette et al. | 475/275 |
| 2005/0258013 A1 | 11/2005 | Stevenson et al. | |
| 2008/0207381 A1 | 8/2008 | Wittkopp et al. | |
| 2008/0314711 A1 | 12/2008 | Jayaram et al. | |
| 2009/0280941 A1 | 11/2009 | Dusenberry et al. | |
| 2010/0063693 A1 | 3/2010 | Lee et al. | |
| 2010/0248890 A1 | 9/2010 | Baldwin | |
| 2012/0138412 A1 | 6/2012 | Rogner | |
| 2012/0193188 A1 | 8/2012 | Neelakantan et al. | |

OTHER PUBLICATIONS

Farzad Same and Chunhao Joseph Lee, Selectable One-Way Clutch in GM's RWD 6-Speed Automatic Transmissions, SAE Int., Jan. 2009, vol. 2, Issue 1, Brice Pawley Means industries, USA.

* cited by examiner

*Primary Examiner* — Tisha Lewis

(57) ABSTRACT

A transmission includes an input member, an output member, a plurality of torque-transmitting mechanisms that are selectively engageable to establish at least eight forward speed ratios and at least one reverse speed ratio between the input member and the output member, and one or more latches associated with one or more of the torque-transmitting mechanisms. The one or more latches engages the respective torque-transmitting mechanisms during or prior to a start event.

19 Claims, 3 Drawing Sheets

| GEAR STATE | 26 | 24 | 32 | 28 | 30 |
|---|---|---|---|---|---|
| R | X | X |  |  | X |
| N | O | O |  |  |  |
| 1ST | X | X |  | X |  |
| 2ND | X | X | X |  |  |
| 3RD |  | X | X | X |  |
| 4TH |  | X | X |  | X |
| 5TH |  | X |  | X | X |
| 6TH |  |  | X | X | X |
| 7TH | X |  |  | X | X |
| 8TH | X |  | X |  | X |

Fig-4

MULTI-SPEED TRANSMISSION WITH AN ENGINE START/STOP ENABLER

CROSS-REFERENCE TO RELATED APPLICATION

This application is a continuation of U.S. patent application Ser. No. 13/216,991, filed on Aug. 24, 2011, the entire contents of which are incorporated herein by reference.

FIELD

The present invention relates to a multi-speed transmission having both a plurality of gear sets and torque-transmitting devices that are selectively engageable to achieve multiple gear ratios. More specifically, the present invention relates to a multi-speed transmission that includes an engine start/stop enabler.

BACKGROUND

The statements in this section merely provide background information related to the present disclosure and may or may not constitute prior art.

A typical multiple speed transmission uses a combination of a plurality of torque transmitting mechanisms, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission includes an input member, an output member, a plurality of torque-transmitting mechanisms that are selectively engageable to establish at least four forward speed ratios and at least one reverse speed ratio between the input member and the output member, and one or more latches associated with one or more of the torque-transmitting mechanisms. The one or more latches engages the respective torque-transmitting mechanisms during or prior to a start event.

Further features, advantages, and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, emphasis instead being placed upon illustrating the principles of the invention. Moreover, in the figures, like reference numerals designate corresponding parts throughout the views. In the drawings:

FIG. 4 is a truth table listing the engaged torque-transmitting mechanisms for selected torque ratios achieved by the transmission of FIG. 2.

DETAILED DESCRIPTION

The following description is merely exemplary in nature and is not intended to limit the present disclosure, application, or uses.

At the outset, it should be appreciated that in the particular example provided, the eight speed automatic transmission of the present invention has an arrangement of permanent mechanical connections between the elements of the four planetary gear sets. These mechanical connections generically link or relate the transmission embodiments. More specifically, a first component or element of a first planetary gear set is permanently coupled to a first component or element of the second planetary gear set. A second component or element of the first planetary gear set is permanently coupled to a third component or element of a fourth planetary gear set. A third component or element of the second planetary gear set is permanently coupled to a third component or element of a third planetary gear set. A second component or element of the third planetary gear set is permanently coupled to a second component or element of the fourth planetary gear set.

Figure 1:
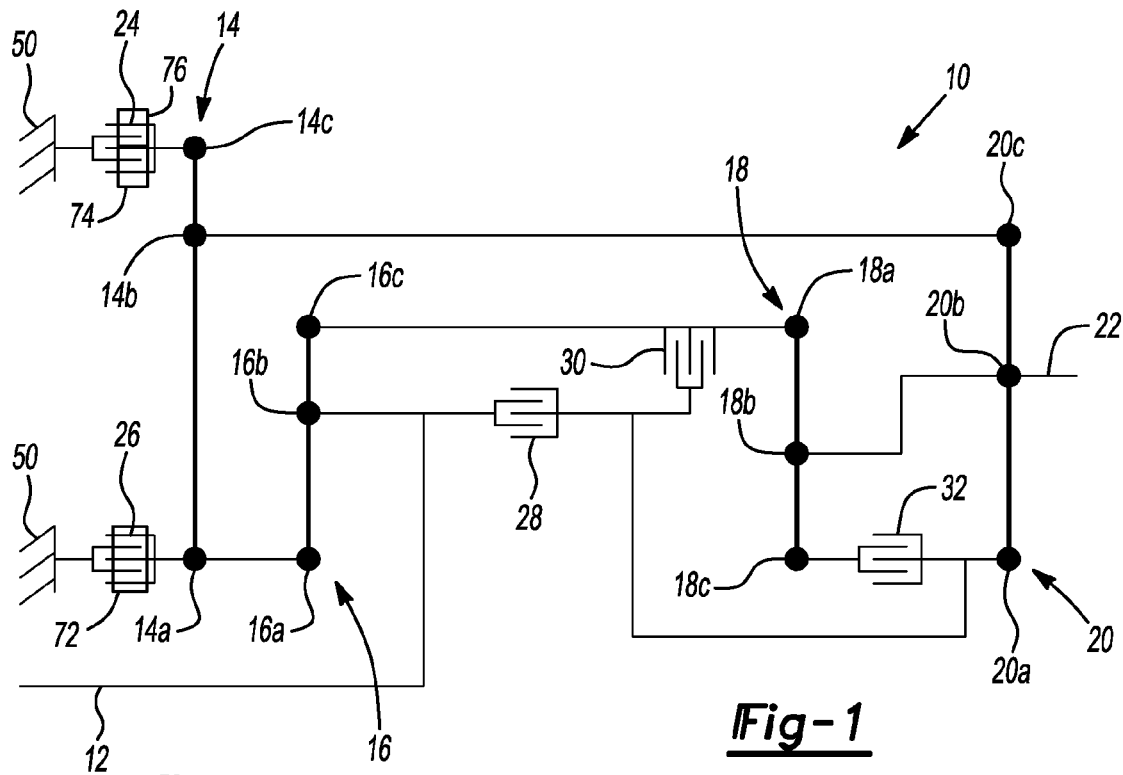
FIG. 1 is a lever diagram of an example of the transmission in accordance with the present invention.

Referring now to FIG. 1, an embodiment of an eight speed transmission 10 for a motor vehicle is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque-transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14 having three nodes: a first node 14A, a second node 14B and a third node 14C, a second planetary gear set 16 having three nodes: a first node 16A, a second node 16B and a third node 16C, a third planetary gear set 18 having three nodes: a first node 18A, a second node 18B and a third node 18C, a fourth planetary gear set 20 having three nodes: a first node 20A, a second node 20B and a third node 20C and an output shaft or member 22.

The input member 12 is coupled to the second node 16A of the second planetary gear set 16. The first node 14A of the first planetary gear set 14 is coupled to the first node 16A of the second planetary gear set 16. The second node 14B of the first planetary gear set 14 is coupled to the third node 20C of the fourth planetary gear set 20. The third node 16C of the second planetary gear set 16 is coupled to the first node 18A of the third planetary gear set 18. The second node 18B of the third planetary gear set 18 is coupled to the second node 20B of the fourth planetary gear set 20. The output member 22 is coupled to the second node 20B of the fourth planetary gear set 20.

A first torque-transmitting mechanism 24 selectively connects the third node 14C of the first planetary gear set 14 with a stationary element or transmission housing 50. A second torque-transmitting mechanism 26 selectively connects the first node 14A of the first planetary gear set 14 with the transmission housing 50. A third torque-transmitting mechanism 28 selectively connects the input member 12 and the second node 16B of the second planetary gear set 16 with the first node 20A of the fourth planetary gear set 20. A fourth torque-transmitting mechanism 30 selectively connects the third node 16C of the second planetary gear set 16 and the first node 18A of the third planetary gear set 18 with the first node 20A of the fourth planetary gear set 20. A fifth torque-transmitting mechanism 32 selectively connects the third node 18C of the third planetary gear set 18 with the first node 20A of the fourth planetary gear set 20A.

Figure 2:
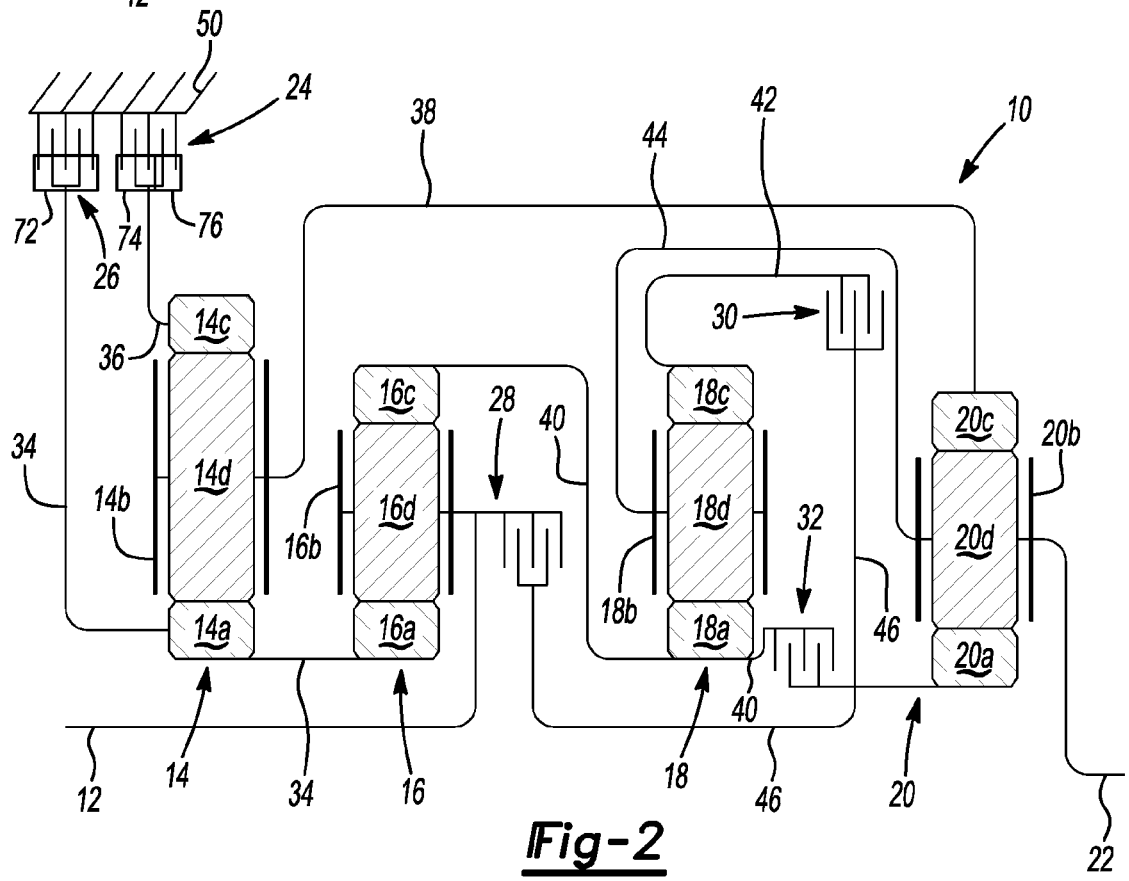
FIG. 2 is a schematic representation of an example of the transmission shown in FIG. 1 in accordance with the present invention.

Referring now to FIG. 2, a stick diagram presents a schematic layout of an example of the eight speed transmission 10 according to the present invention. In FIG. 2, the numbering from the lever diagram of FIG. 1 is carried over. The clutches, brake and couplings are correspondingly presented whereas the nodes of the planetary gear sets now appear as components of planetary gear sets such as sun gears, ring gears, planet gears and planet gear carriers.

In an example of the present invention, a first planetary gear set 14 is a simple planetary gear set. More specifically, planetary gear set 14 includes a sun gear member 14A, a ring gear member 14C and a carrier member 14B that rotatably supports a set of planet gears 14D (only one shown). Sun gear member 14A is connected for common rotation with a first shaft or interconnecting member 34. Ring gear member 14C is connected for common rotation with a second shaft or interconnecting member 36. Carrier member 14B is connected for common rotation with a third shaft or interconnecting member 38. The planet gears 14D are configured to intermesh with both the sun gear member 14A and the ring gear member 14C.

In another example of the present invention, a second planetary gear set 16 is a simple planetary gear set. More specifically, planetary gear set 16 includes a sun gear member 16A, a ring gear member 16C and a carrier member 16B that rotatably supports a set of planet gears 16D (only one shown). Sun gear member 16A is connected for common rotation with the first shaft or interconnecting member 34. Ring gear member 16C is connected for common rotation with a fourth shaft or interconnecting member 40. Carrier member 16B is connected for common rotation with an input shaft 12. The planet gears 16D are configured to intermesh with both the sun gear member 16A and the ring gear member 16C.

In yet another example of the present invention, a third planetary gear set 18 is a simple planetary gear set. More specifically, planetary gear set 18 includes a sun gear member 18A, a ring gear member 18C and a carrier member 18B that rotatably supports a set of planet gears 18D (only one shown). Sun gear member 18A is connected for common rotation with the fourth shaft or interconnecting member 40. Ring gear member 18C is connected for common rotation with a fifth shaft or interconnecting member 42. Carrier member 18B is connected for common rotation with a sixth shaft or interconnecting member 44. The planet gears 18D are configured to intermesh with both the sun gear member 18A and the ring gear member 18C.

In yet another example of the present invention, a fourth planetary gear set 20 is a simple planetary gear set that includes a sun gear member 20A, a ring gear member 20C and a carrier member 20B that rotatably supports a set of planet gears 20D (only one shown). Sun gear member 20A is connected for common rotation with a seventh shaft or interconnecting member 46. Ring gear member 20C is connected for common rotation with the third shaft or interconnecting member 38. Carrier member 20B is connected for common rotation with the sixth shaft or interconnecting member 44 and an output shaft 22. The planet gears 20D are configured to intermesh with both the sun gear member 20A and the ring gear member 20C.

The input shaft or member 12 is preferably continuously connected to an engine or to a turbine of a torque converter or an electric motor. The output shaft or member 22 is preferably continuously connected with a final drive unit or transfer case (not shown).

The torque-transmitting mechanisms such as a first, second, third, fourth, and fifth clutches 24, 26, 28, 30, and 32 allow for selective interconnection of the shafts or interconnecting members 34-46, members of the planetary gear sets 14-20 and the housing 50. For example, the first clutch 24 is selectively engageable to connect the second shaft or interconnecting member 36 with the stationary element, ground, or the transmission housing 50. The second clutch 26 is selectively engageable to connect the first shaft or interconnecting member 34 with the stationary element, ground, or the transmission housing 50. The third clutch 28 is selectively engageable to connect the input shaft or member 12 with the seventh shaft or interconnecting member 46. The fourth clutch 30 is selectively engageable to connect the fifth shaft or interconnecting member 42 with the seventh shaft or interconnecting member 46. The fifth clutch 32 is selectively engageable to connect the fourth interconnecting shaft or member 40 with the seventh interconnecting shaft or member 46.

Referring now to FIGS. 2 and 4, the operation of the example of the eight speed transmission 10 will be described. It will be appreciated that transmission 10 is capable of transmitting torque from the input shaft or member 12 to the output shaft or member 22 in at least eight forward speed states or torque ratios and at least one reverse speed state or torque ratio. Each forward and reverse speed state or torque ratio is attained by engagement of one or more of the torque-transmitting mechanisms (i.e. first, second, third, fourth, and fifth clutches 24, 26, 28, 30, 32), as will be explained below. FIG. 4 is a truth table presenting the various combinations of torque-transmitting mechanisms that are activated or engaged X to achieve the various gear states.

For example, to establish reverse gear state R, the first clutch 24 is engaged or activated X and the second and fourth clutches 26 and 30 are engaged or activated X. The first clutch 24 in the engaged mode connects the second shaft or interconnecting member 36 with the stationary element, ground, or the transmission housing 50. The second clutch 26 connects the first shaft or interconnecting member 34 with the stationary element or transmission housing 50. The fourth clutch 30 connects the fifth shaft or interconnecting member 42 with the seventh shaft or interconnecting member 46.

To establish the first gear state $1^{st}$, the first, second, and third clutches 24, 26, 28 are engaged or activated X. The first clutch 24 connects the second shaft or interconnecting member 36 and the stationary element or transmission housing 50. The second clutch 26 connects the first shaft or interconnecting member 34 with the stationary element or the transmission housing 50. The third clutch 28 connects the input shaft or member 12 with the seventh shaft or interconnecting member 46.

To establish the second gear state $2^{nd}$, the first, second, and fifth clutches 24, 26, and 32 are engaged or activated X. The first clutch 24 connects the second shaft or interconnecting member 36 and the stationary element or transmission housing 50. The second clutch 26 connects the first shaft or interconnecting member 34 with the stationary element or the transmission housing 50. The fifth clutch 32 connects the fourth shaft or interconnecting member 40 with the seventh shaft or interconnecting member 46.

To establish the sixth gear state $6^{th}$, the first clutch 24 is disengaged and the third, fourth, and fifth clutches 28, 30, 32 are engaged or activated X. The clutch 24 in the disengaged mode acts as a traditional one-way clutch between the second shaft or interconnecting member 36 and the stationary element or transmission housing 50. The third clutch 28 connects the input shaft or member 12 with the seventh shaft or interconnecting member 46. The fourth clutch 30 connects the fifth shaft or interconnecting member 42 with the seventh shaft or interconnecting member 46. The fifth clutch 32 connects the fourth shaft or interconnecting member 40 with the seventh shaft or interconnecting member 46. Likewise, the eight forward speed states are achieved through different combinations of clutch engagement, as shown in FIG. 5.

Figure 3:
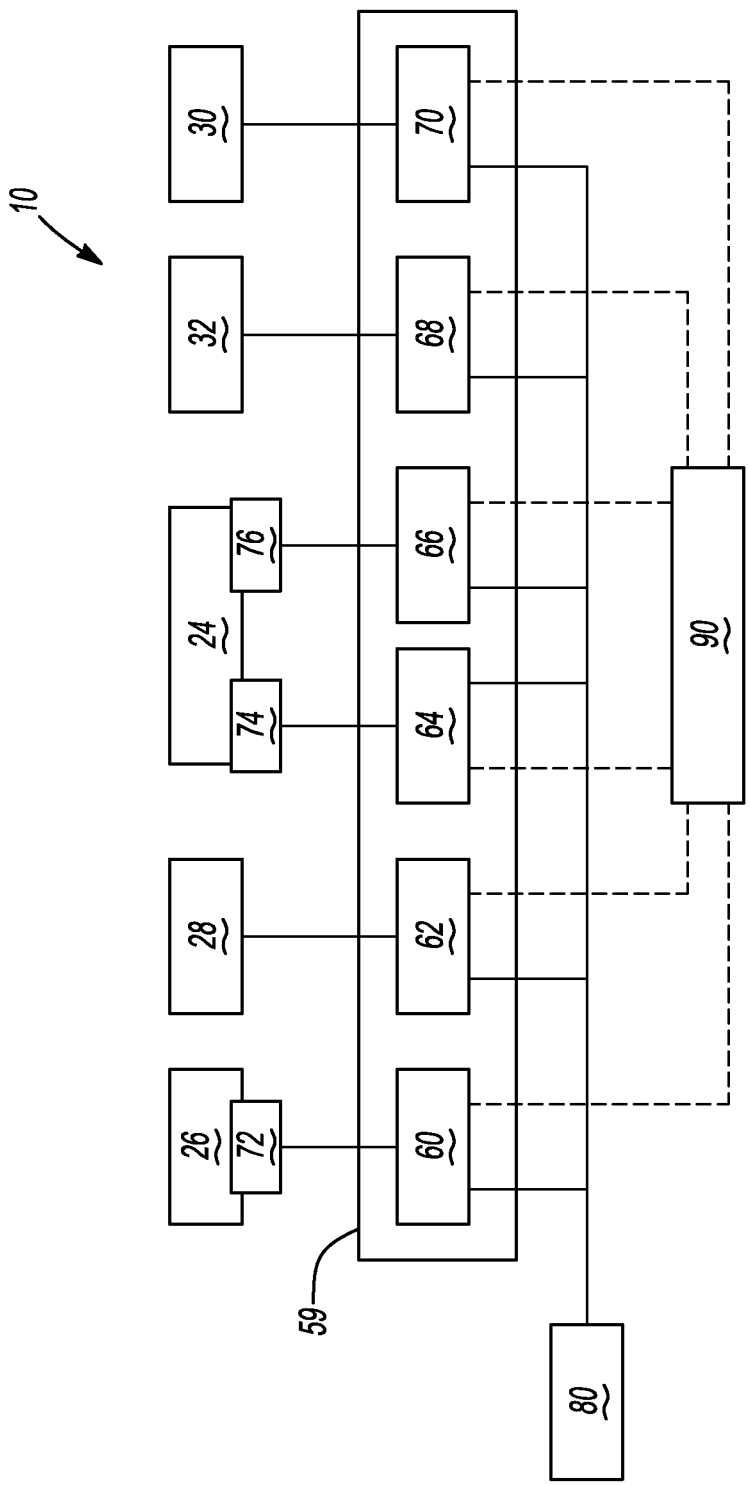
FIG. 3 is a block diagram of the transmission shown with an engine start/stop enabler.

With further reference to FIG. 3, the transmission 10 includes an engine start/stop enabler with a latch 72 associated with the second clutch 26 and a pair of latches 74 and 76 associated with the first clutch 24. The transmission also includes a hydraulic control system 59 with a first variable force solenoid 64, a second variable force solenoid 66, a third variable force solenoid 60, a fourth variable force solenoid 62, a fifth variable force solenoid 70, and a sixth variable force solenoid 68. In the particular arrangement shown in FIG. 3, the first clutch 24 is in communication with the first and the second variable force solenoids 64 and 66. The second clutch 26 is in communication with the third variable force solenoid 60. The third clutch 28 is in communication with the fourth variable force solenoid 62. The fourth clutch 30 is in communication with the fifth variable force solenoid 70, and the fifth clutch 32 is in communication with the sixth variable force solenoid 68. Although the first clutch 24 is associated with a pair of latches and a respective pair of variable force solenoids, in some arrangements, a single latch and a single variable force solenoid are associated with the first clutch 24.

Note further that other hydraulic control systems can be used in certain types of arrangements. For example, in various arrangements, the hydraulic control system 59 includes, for example, variable bleed solenoids or on/off devices or any other suitable devices to selectively engage the torque transmitting mechanisms 60, 62, 64, 66, 68, and 70 by selectively communicating hydraulic fluid to the various torque transmitting mechanisms.

The variable force solenoids communicate in turn with the transmission pump or an accumulator 80 or auxiliary pump and receive instructions from a controller 90. The controller 90 can be associated with the motor vehicle's engine, transmission, or hybrid control module.

When the motor vehicle comes to a stop, the motor vehicle typically starts again in first, second, or reverse gear. That is clutches 24, 26, and 30 are engaged for reverse gear; clutches 24, 26, and 28 are engaged for first gear; or clutches 24, 26, and 32 are engaged for second gear. So that the motor vehicle is ready to start again, the transmissions pump is generally sized to pump sufficient pressure to the clutches 24, 26, 28, 30, and 32 after a vehicle stop so that the clutches 24 and 26 and one of the clutches 28, 30, and 32 can be readily engaged when the vehicle starts again when the latches 72, 74, and 76 are not employed. Alternatively, the accumulator 80 is sized to provide sufficient fluid volume and flow, as moderated by respective variable force solenoids 60, 62, 64, 66, 68, and 70, to the clutches 24 and 26 and one of the clutches 28, 30, and 32. Alternatively, an auxiliary pump can be employed in place of the accumulator to provide the appropriate hydraulic fluid pressure to the devices in the hydraulic control system 59 to selectively engage the torque transmitting mechanisms 24, 26, 28, 30, and 32. In some arrangements a combination of two or all of the transmission pump, the accumulator 80, and the auxiliary pump provides flow to the torque transmitting mechanisms.

With the implementation of the latches 72, 74, and 76, which can be mechanical latches or hydraulic latches or any other suitable mechanism and which can be under the control of the controller 90, the clutches 24 and 26 can be considered holding clutches. That is prior to or at a start event, the latches 72, 74, and 76 are activated to engage the clutches 24 and 26. As such, the transmissions pump or the accumulator 80 or auxiliary pump only has to provide sufficient pressure or sufficient volume to engage one of the clutches 28, 30, and 32 for first, reverse, or second gear. In sum, with the use of the latches 72, 74, and 76, the transmission pump or the accumulator 80 or auxiliary pump is sized to provide pressure or fluid volume for one clutch for a start event, whereas without the latches 72, 74, and 76, the transmission pump or the accumulator 80 or auxiliary pump is sized to provide pressure or fluid volume for three clutches for a start event.

Note that the use of the latches 72, 74, and 76 are not limited to eight speed transmissions. The latches can be implemented into transmissions with fewer speeds, such as, for example, transmissions with four, five, six, or seven forward speeds (both rear-wheel and front-wheel drive). Moreover, the latches can be implemented into transmissions with more than eight speeds, such as, for example, transmissions with nine, ten, or more forward speeds.

The description of the invention is merely exemplary in nature and variations that do not depart from the gist of the invention are intended to be within the scope of the invention. Such variations are not to be regarded as a departure from the spirit and scope of the invention.

What is claimed is:

1. A transmission in a motor vehicle, the transmission comprising:
   an input member;
   an output member;
   first, second, third and fourth planetary gear sets each having first, second and third members;
   five torque transmitting mechanisms each selectively engageable to interconnect one of the first, second, and third members with at least one other of the first members, second members, third members and a stationary member, wherein the torque transmitting mechanisms are selectively engageable in combinations of at least three to establish at least eight forward speed ratios and at least one reverse speed ratio between the input member and the output member; and
   a first latching mechanism connected to a second of the five torque transmitting mechanisms, wherein the first latching mechanism latches the second torque transmitting mechanism in a ready state when the motor vehicle is stopped;
   a second latching mechanism connected to a first of the five torque transmitting mechanisms, wherein the second latching mechanism latches the first torque transmitting mechanism in a ready state when the motor vehicle is stopped; and a third latching mechanism connected to the first of the five torque transmitting mechanisms, wherein the third latching mechanism latches the first torque transmitting mechanism in a ready state when the motor vehicle is stopped, wherein the first and second torque transmitting mechanisms are in the engaged state during a first forward gear or a second forward gear.

2. The transmission of claim 1 wherein the first and second torque transmitting mechanisms are in the engaged state during a reverse gear.

3. The transmission of claim 1 wherein at least one of the latching mechanisms latches a respective torque transmitting mechanism during an auto start of the motor vehicle after an automatic engine stop event.

4. The transmission of claim 1 wherein the first, second and third latching mechanisms are hydraulic latching mechanisms.

5. The transmission of claim 1 the first, second and third latching mechanisms are mechanical latching mechanisms that are mechanically coupled to the first and second torque transmitting mechanisms.

6. The transmission of claim 1 further comprising:
a first interconnecting member continuously interconnecting the first member of the first planetary gear set with the first member of the second planetary gear set;
a second interconnecting member continuously interconnecting the second member of the first planetary gear set with the third member of the third planetary gear set;
a third interconnecting member continuously interconnecting the third member of the second planetary gear set with the first member of the third planetary gear set; and
a fourth interconnecting member continuously interconnecting the second member of the third planetary gear set with the second member of the fourth planetary gear set.

7. The transmission of claim 6 wherein the first of the five torque transmitting mechanisms is selectively engageable to interconnect the third member of the first planetary gear set with a stationary member.

8. The transmission of claim 7 wherein the second of the five torque transmitting mechanisms is selectively engageable to interconnect the first member of the first planetary gear set with the stationary member.

9. The transmission of claim 8 wherein a third and a fourth of the five torque transmitting mechanisms are selectively engageable to interconnect the third member of the third planetary gear set to the second member of the second planetary gear set and the input member.

10. The transmission of claim 9 wherein a fifth of the five torque transmitting mechanisms is selectively engageable to interconnect the first member of the third planetary gear set and the first member of the fourth planetary gear set.

11. The transmission of claim 10 wherein the first members of the first, second, third and fourth planetary gear sets are sun gears, the second members of the first, second, third and fourth planetary gear sets are carrier members, and the third members of the first, second, third and fourth planetary gear set are ring gears.

12. The transmission of claim 1 wherein the input member is continuously interconnected with the second member of the second planetary gear set and wherein the output member is continuously interconnected with the second member of the fourth planetary gear set.

13. The transmission of claim 1 wherein two of the torque transmitting mechanisms are brakes and three of the torque transmitting mechanisms are clutches.

14. The transmission of claim 1 wherein the stationary member is a transmission housing.

15. A transmission comprising:
an input member;
an output member;
first, second, third and fourth planetary gear sets each having first, second and third members, wherein the input member is continuously interconnected with the second member of the second planetary gear set and wherein the output member is continuously interconnected with the second member of the fourth planetary gear set;
a first interconnecting member continuously interconnecting the first member of the first planetary gear set with the first member of the second planetary gear set;
a second interconnecting member continuously interconnecting the second member of the first planetary gear set with the third member of the third planetary gear set;
a third interconnecting member continuously interconnecting the third member of the second planetary gear set with the first member of the third planetary gear set;
a fourth interconnecting member continuously interconnecting the second member of the third planetary gear set with the second member of the fourth planetary gear set;
a first of five torque transmitting mechanisms selectively engageable to interconnect the third member of the first planetary gear set with a stationary member;
a second of the five torque transmitting mechanisms selectively engageable to interconnect the first member of the first planetary gear set with the stationary member;
a third and a fourth of the five torque transmitting mechanisms selectively engageable to interconnect the third member of the third planetary gear set to the second member of the second planetary gear set and the input member;
a fifth of the five torque transmitting mechanisms selectively engageable to interconnect the first member of the third planetary gear set and the first member of the fourth planetary gear set;
a first latching mechanism connected to the second of the five torque transmitting mechanisms, wherein the first latching mechanism latches the second torque transmitting mechanism in a ready state when the motor vehicle is stopped;
a second latching mechanism connected to the first of the five torque transmitting mechanisms, wherein the second latching mechanism latches the first torque transmitting mechanism in a ready state when the motor vehicle is stopped; and
a third latching mechanism connected to the first of the five torque transmitting mechanisms, wherein the third latching mechanism latches the first torque transmitting mechanism in a ready state when the motor vehicle is stopped,
wherein the first and second torque transmitting mechanisms are in the engaged state during a first forward gear or a second forward gear.

16. The transmission of claim 15 wherein the first and second torque transmitting mechanisms are in the engaged state during a reverse gear.

17. The transmission of claim 15 wherein the first latching mechanism latches the second torque transmitting device during a startup of the motor vehicle after an automatic engine stop event and the second latching mechanism latches the first torque transmitting device during the startup of the motor vehicle after the automatic engine stop event.

18. The transmission of claim 17 wherein the third latching mechanism latches the first torque transmitting device during a startup of the motor vehicle after an automatic engine stop event.

19. A transmission comprising:
an input member;
an output member;
first, second, third and fourth planetary gear sets each having first, second and third members, wherein the input member is continuously interconnected with the second member of the second planetary gear set and wherein the output member is continuously interconnected with the second member of the fourth planetary gear set;
a first interconnecting member continuously interconnecting the first member of the first planetary gear set with the first member of the second planetary gear set;
a second interconnecting member continuously interconnecting the second member of the first planetary gear set with the third member of the third planetary gear set;
a third interconnecting member continuously interconnecting the third member of the second planetary gear set with the first member of the third planetary gear set;
a fourth interconnecting member continuously interconnecting the second member of the third planetary gear set with the second member of the fourth planetary gear set;
a first of five torque transmitting mechanisms selectively engageable to interconnect the third member of the first planetary gear set with a stationary member;
a second of the five torque transmitting mechanisms selectively engageable to interconnect the first member of the first planetary gear set with the stationary member;
a third and a fourth of the five torque transmitting mechanisms selectively engageable to interconnect the third member of the third planetary gear set to the second member of the second planetary gear set and the input member;
a fifth of the five torque transmitting mechanisms selectively engageable to interconnect the first member of the third planetary gear set and the first member of the fourth planetary gear set;
a first latching mechanism connected to the second of the five torque transmitting mechanisms, wherein the first latching mechanism latches the second torque transmitting mechanism in a ready state when the motor vehicle is stopped;
a second latching mechanism connected to the first of the five torque transmitting mechanisms, wherein the second latching mechanism latches the first torque transmitting mechanism in a ready state when the motor vehicle is stopped; and
a third latching mechanism connected to the first of the five torque transmitting mechanisms, wherein the third latching mechanism latches the first torque transmitting mechanism in a ready state when the motor vehicle is stopped,
wherein the first and second torque transmitting mechanisms are in the engaged state during a first forward gear or a second forward gear, and
wherein the torque transmitting mechanisms are selectively engageable in combinations of at least three to establish at least eight forward speed ratios and at least one reverse speed ratio between the input member and the output member.

* * * * *